WAYLAND W. HILL
AUBREY O. KIDWELL
INVENTORS

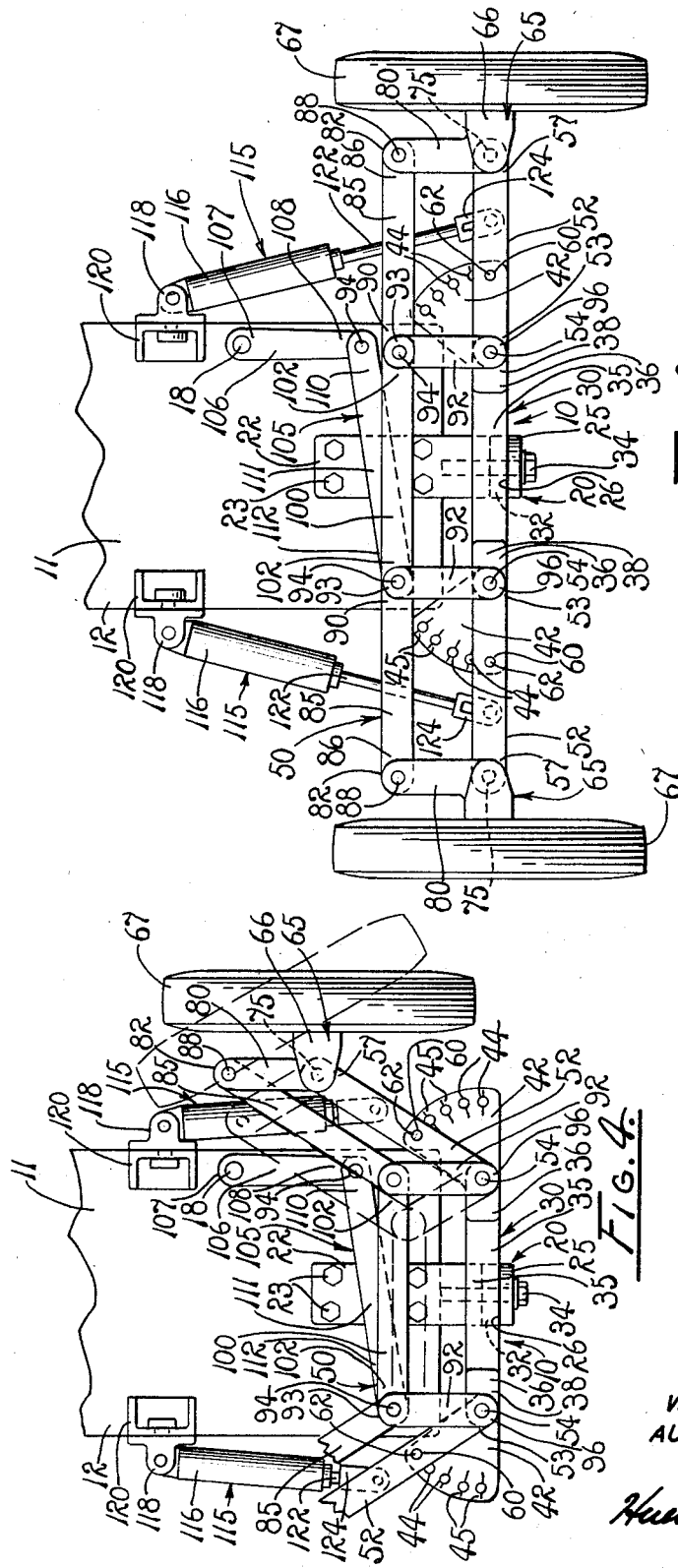

3,411,804
MOUNTING SYSTEM FOR VEHICLE STEERING WHEELS
Wayland W. Hill, P.O. Box 168, and Aubrey O. Kidwell,
Rte. 1, Box 172, both of Earlimart, Calif. 93219
Filed Apr. 10, 1967, Ser. No. 629,531
7 Claims. (Cl. 280—95)

ABSTRACT OF THE DISCLOSURE

A mounting system for the steerable wheels of a vehicle in which the wheels are individually supported on sets of parallelogram linkages that permit the wheels to be selectively independently or simultaneously disposed in adjusted positions laterally outwardly spaced from the vehicle and from each other in parallel relation and which includes means interconnecting the sets of parallelogram linkages with each other and with a steering mechanism of the vehicle permitting steering of the wheels in all such laterally adjusted positions without manual adjustment of the steering mechanism or the connecting means.

Background of the invention

Nonsteerable vehicle wheels on agricultural tractors and the like have long been laterally adjustable in order to vary the width of the tracks of the vehicles to conform to different furrow spacing between row crops. However, such adjustments have been difficult to accomplish on the steerable wheels of such vehicles because of the steering linkages provided between the wheels. The prior art, as represented by the Strethlow Patent No. 2,911,229, has provided systems for laterally adjusting the steerable wheels of a vehicle by utilizing axles which provide telescopic sections for effecting such lateral adjustment. A plurality of alignable holes are formed through the axle sections and lock pins are provided to hold the wheels in their selected adjusted positions. Such axles require that the tie rods or other steering linkages associated therewith be similarly telescoped in order to accommodate such lateral movement of the axles and wheels. However, in order to effect such adjustment, the wheels are required to be elevated from the ground by jacking up the vehicle. The telescopic sections of the axles and tie rods frequently become rusted or otherwise stuck together so as to require forcible freeing and manual extension to the desired adjusted positions. The tools necessary for such operations are not always readily available as it is frequently desirable and necessary to make such adjustments in the field. Furthermore, the adjusting holes substantially weaken the axles which frequently causes breakdowns and expensive repairs. Other systems for laterally adjusting the nonsteerable wheels of vehicles have employed parallelogram linkages, as shown in the Van der Lely et al. Patent No. 2,936,034. However, it is believed that such parallelogram linkage systems have not been heretofore adapted to the steerable wheels of a vehicle which utilize the parallelogram linkages for steering purposes.

Accordingly, it is an object of the present invention to provide an improved mounting system for the steerable wheels of a vehicle.

Another object is to provide such an improved mounting system which permits the steerable wheels of a vehicle to be laterally adjusted in the field without special tools.

Another object is to provide an improved mounting system for the steerable wheels of a vehicle which permits lateral adjustment of the wheels during operation without jacking up the vehicle.

Another object is to provide an improved mounting system for the steerable wheels of a vehicle which utilizes sets of parallelogram linkages which maintain the wheels in substantially parallel relation in all adjusted positions.

Another object is to provide such an improved mounting system in which the parallelogram wheel support linkages are connected to the vehicle steering system to permit selective independent or simultaneous lateral adjustment of the wheels and which permits the wheels to be angularly positioned in all laterally adjusted positions without any adjustment or modification of the steering mechanism of the vehicle.

Other objects and advantages of the present invention will subsequently become more clearly apparent upon reference to the following description and accompanying drawings.

Brief description of the drawings

FIG. 3 is a bottom plan view of the mounting system of the present invention showing the wheels disposed in their maximum laterally outwardly adjusted positions.

FIG. 4 is a fragmentary bottom plan view of the mounting system disposed in a maximum retracted position in full lines and showing the wheels in a maximum angularly disposed steering position in dashed lines.

Description of the preferred embodiment

Figure 1:
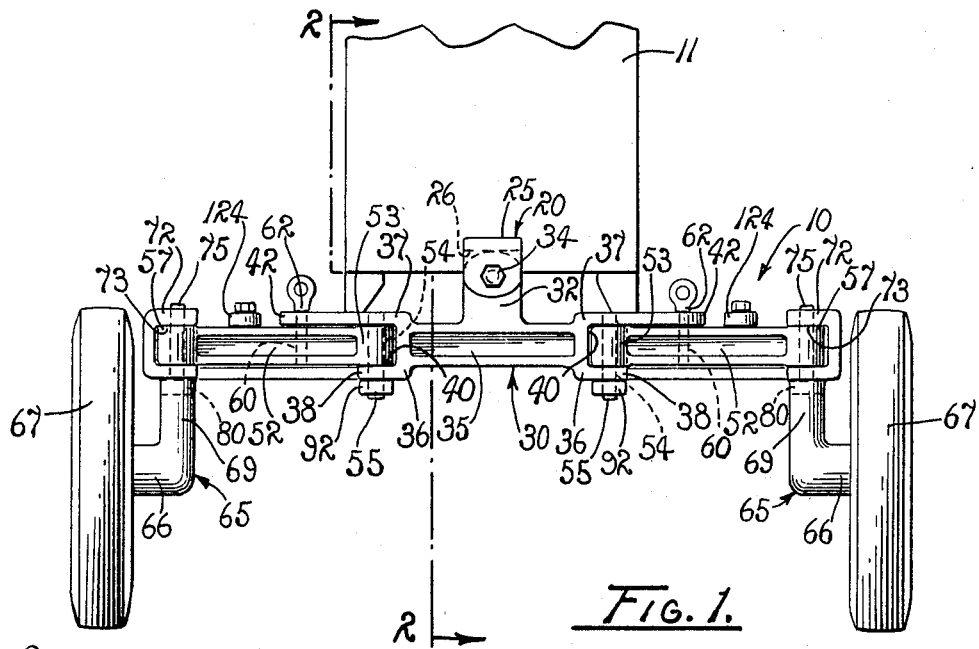
FIG. 1 is a front elevation of a mounting system for the steerable wheels of a vehicle embodying the principles of the present invention.
Figure 2:
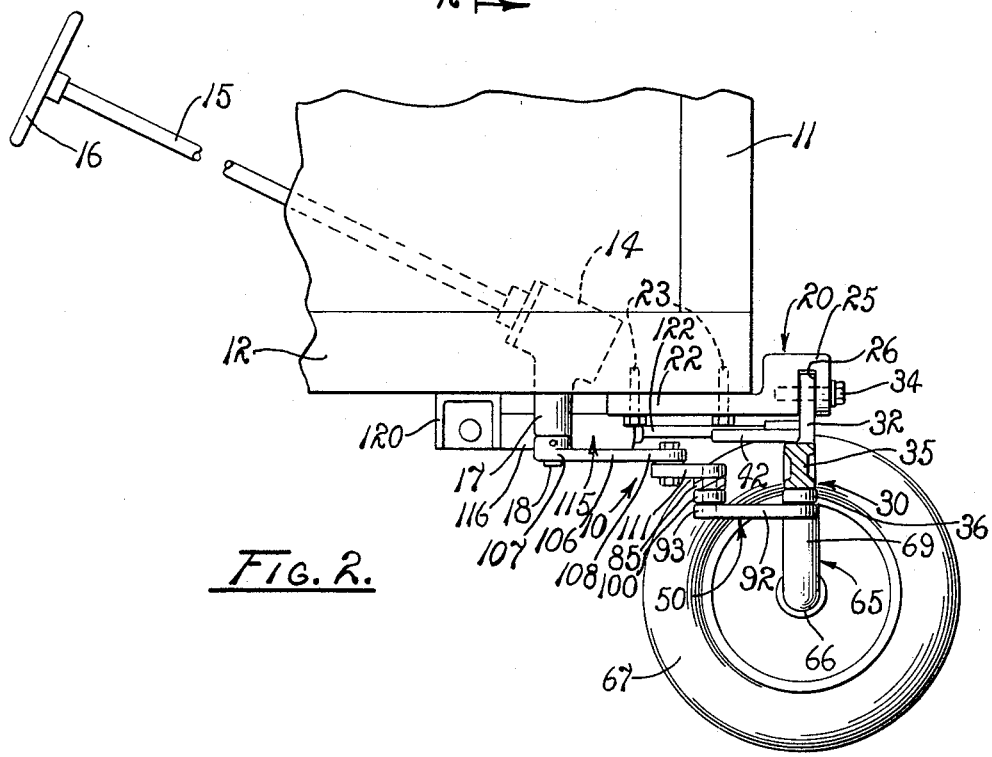
FIG. 2 is a transverse vertical section through the mounting system, taken on line 2—2 of FIG. 1, and showing the steering system of the vehicle connected to the mounting system.

Referring more particularly to the drawings, a mounting system embodying the principles of the present invention is generally indicated by the reference numeral 10 and is shown in association with the front end of a vehicle, such as a tractor or the like, which is fragmentarily shown and indicated by the reference numeral 11. The tractor includes a lower frame 12 on which is mounted a steering gear housing 14. An elongated steering column 15 having a steering wheel 16 mounted thereon is upwardly rearwardly extended from the housing for manipulation by an operator in the usual manner. The steering gear housing 14 further includes a depending cylindrical portion 17 extended below the frame of the tractor and an elongated steering shaft 18 extended from the cylindrical portion.

The mounting system 10 of the present invention provides an elongated support bar 20 having a substantially flat rearward portion 22 secured to the underside of the frame 12 of the tractor 11 by a plurality of bolts 23. The support bar provides a forwardly outwardly extended head portion 25 which has a downwardly opening slot 26 therein disposed in a plane substantially normal to the longitudinal axis of the tractor. A centrally disposed support beam 30 is pivotally mounted in depending relation from the head portion 25 of the support bar 20. The support beam includes an integral upwardly extended arm 32 which is slidably received within the slot 26 of the support bar. The support beam is rockably supported in such position by a pivot bolt 34 extended through the head portion 25 and through the upper arm 32 in the plane of the central longitudinal axis of the tractor. The support beam provides a central portion 35 in the form of an I-beam which terminates in opposite bifurcated ends 36. Each of the ends provides upper and lower legs 37 and 38 which define therebetween a bearing receiving notch 40. The upper legs 37 include integral outwardly extended sector plates 42, each providing a plurality of arcuately arranged holes 44 and corresponding calibrations 45 designating various furrow widths.

A pair of sets of parallelogram linkages generally indicated by the reference numeral 50 individually outwardly extend from the opposite ends 36 of the support beam 30. Inasmuch as the parallelogram linkages are identical, the same reference numerals are applied to corresponding components of each set on opposite sides of the tractor. An elongated I-beam axle 52 provides an inner bearing end 53 disposed within the bearing notch 40 of the support beam. The axle is pivotally connected to the support beam by a pivot pin 54 which includes a lower end 55 extended a predetermined distance below the lower leg 38 of the support beam. The axle includes an opposite outer bearing end 57 and a lock pin receiving hole 60 in intermediate relation to its ends which is selectively alignable with the holes 44 in its associated sector plate 42. An elongated lock pin 62 is releasably extendible through the holes 44 and 60 to hold the axle in selected angular positions with respect to the support beam 30.

A wheel mounting spindle 65 is associated with each of the parallelogram linkages 50 and provides a lower spindle end 66 mounting a front wheel 67. The spindle includes a substantially upright portion 69 which terminates in a bifurcated upper end 72 having a bearing slot 73 which receives the outer end 57 of the axle. The spindle is constrained in such position for rotation about a substantially vertical pivot pin 75 extended through its upper end 72 and through the outer end of the axle. As best shown in FIG. 3, an elongated integral arm 80 is rearwardly extended from the wheel mounting spindle and terminates in an outer bored end 82. A lever arm 85 provides an outer end 86 pivotally connected to the outer end 82 of the spindle arm by a pivot pin 88. The lever arm includes an opposite bored inner end 90 extended beneath the frame 12 of the tractor 11. A link 92 of substantially the same effective length as the spindle arm 80 provides a rearward end 93 pivotally connected to the inner end 90 of the lever arm 85 by a pivot pin 94. The link includes a forward end 96 which is pivotally connected to the inner end 53 of the axle 52 on the lower end 55 of the pivot pin 54. Accordingly, the lever arm 85 is maintained in spaced substantially parallel relation to the axle 52 in all angular positions of the axle in order to maintain the wheels 67 in substantially parallel relation to each other. While the wheels are towed inwardly somewhat in the usual manner to facilitate steering, they are maintained in precise corresponding relation with regard to their respective planes in all adjusted positions.

An elongated tie bar 100 provides opposite ends 102 which are individually pivotally connected to the inner ends 90 of the lever arms 85 of the parallelogram linkages 50. The tie bar and lever arms 85 are connected to the steering shaft 18 by a toggle linkage generally indicated by the reference numeral 105. The toggle linkage includes a pitman arm 106 having an end 107 connected to the steering shaft 18 and an opposite end 108 pivotally connected to an end 110 of a lever 111. The lever provides an opposite end 112 pivotally connected to the pivot pin 94 interconnecting the link 92 and the lever arm 85 on the opposite side of the frame 12 of the tractor 11 from the steering housing 14. It is readily apparent that the tie bar 100 and the lever arms 85 of the parallelogram linkages 50 thereby combine to serve the same purpose as a connecting rod in conventional steering linkages.

An hydraulic jack 115 is operationally associated with each of the parallelogram linkages for powered positioning of the wheels 67 laterally toward and away from the tractor 11. Each of the hydraulic jacks includes a cylinder end 116 which is pivotally connected through a universal connection 118 to the frame 12 by a depending bracket 120. The jack further includes a forwardly extended rod end 122 which is pivotally connected through a universal connection 124 to the axle 52 at a point midway between the hole 60 and the outer end 57.

Operation

The operation of the described embodiment is believed to be clearly apparent and is briefly summarized at this point. Assuming that the parallelogram linkages 50 are disposed in the positions shown in FIG. 3, the wheels 67 are located in their maximum laterally spaced positions from each other and from the tractor 11. In such position, the lock pins 62 are extended through the forwardmost holes 44 in the sector plates 42 and through their respective axles 50 to maintain the axles in a common plane substantially normal to the longitudinal axis of the tractor. It is noted that the rod ends 122 of the hydraulic jacks 115 are fully extended from the cylinder ends 116 further to brace and to hold the axles in their described positions.

The tractor 11 may then be operated in the usual manner and the wheels 67 angularly adjusted by manipulation of the steering wheel 16 also in the usual manner. During such manipulation of the steering wheel, the shaft 18 is effective to swing the pitman arm 106 in the desired direction for effecting steering of the tractor. If the pitman arm is swung in a clockwise direction, as viewed in FIG. 3, the effective length of the toggle arm 105 is increased to position the lever arms 85 and the tie bar 100 to the left. Such movement is permitted by the links 92 and the spindle arms 80 which are swung in a counter-clockwise direction about their forward pivot pins 54 and 75, respectively, angularly to position the wheels for the desired turn. It is apparent that during such movement, the parallelogram linkages maintain the wheels in substantially parallel relation throughout their full range of angular positions. It is further noted that during operation of the tractor, the axles and wheels are permitted limited transverse tipping or elevational swinging movement about the pivot bolt 34 of the support beam 30.

When it is desired to conform the track of the tractor with a narrower furrow spacing, the lock pins 62 are removed from their respective sector plate and axle holes 44 and 60, respectively. The tractor is then moved either forwardly or rearwardly and the hydraulic jacks 115 are actuated to retract the rod ends 122. Such retraction is continued during movement of the tractor until the axle holes 60 are aligned with the appropriate holes 44 in the sector plates 42 to dispose the wheels the desired distance from the frame 12 of the tractor. During such movement, the axles 52 and the lever arms 85 are rearwardly swung in parallel relation to each other about their respective inner pivots 54 and 94, respectively, to maintain the wheels in precise parallel relation. Such movement can continue until the wheels are disposed in their maximum retracted positions of FIG. 4 wherein the axle holes 60 are aligned with the rearwardmost holes 44 in their respective sector plates and the hydraulic jacks are fully retracted. It should be further noted that if the tractor is located on a surface on which the wheels can be slid, the tractor need not be traveled during such positioning when the hydraulic jacks 115 are employed. However, the hydraulic jacks are not necessarily required inasmuch as such lateral positioning of the wheels can be accomplished by the desired forward or rearward travel of the tractor when the lock pins 62 are removed. Accordingly, if the wheels are to be inwardly positioned, forward movement of the tractor will cause the parallelogram linkages automatically to swing rearwardly to the desired adjusted position. Conversely, if the wheels are to be repositioned outwardly from the tractor, rearward travel of the tractor will cause the wheels automatically to swing away from the frame of the tractor.

As best shown in FIG. 4, the previously described angular positioning of the wheels 67 can be accomplished in any lateral position of the wheels. As shown, upon actuation of the pitman arm 106 by the steering wheel 16, the tie bar 100 and lever arms 85 are manipulated angularly to position the wheels for steering the tractor in the identical manner as accomplished when the wheels are disposed in their maximum laterally disposed positions. It is significant that the wheels may be independently laterally adjusted if dictated by the particular spacing of the furrows and row crops and it is frequently desirable to have one of the wheels spaced either closer or farther away from the tractor than the other wheel. Even in extreme conditions, the steering capabilities of the mounting system of the present invention are not impaired. No matter what angular relation the lever arms 85 bear to the tie bar 100, the system is always effective to angularly position the wheels in the desired substantially parallel relation.

In view of the foregoing, it is readily apparent that the structure of the present invention provides an improved mounting system for the steerable wheels of a vehicle. Such mounting system enables the wheels to be either independently or simultaneously laterally adjusted with respect to the vehicle and at the same time, such system is utilized in connection with the steering mechanism of the vehicle to angularly position the wheels in all their laterally adjusted positions.

Having described our invention, what we claim as new and desire to secure by Letters Patent is:

1. A mounting system for the steerable wheels of a vehicle comprising a pair of sets of parallelogram linkages each having inner end portions pivotally mounted on the vehicle and opposite outer end portions mounting a vehicle support wheel for laterally adjusting the spacing of the wheels from the vehicle and from each other, and means interconnecting said sets of parallelogram linkages for angularly adjusting the wheels in substantially parallel relation to each other for steering the vehicle in all lateral positions of the wheels.

2. The mounting system of claim 1 including powered means borne by the vehicle individually connected to said sets of parallelogram links for selective independent or simultaneous lateral displacement of the wheels.

3. The mounting system of claim 2 including a support pivotally mounted on the vehicle for limited movement about a substantially horizontal axis, said inner end portions of the parallelogram linkages being pivotally mounted on said support permitting said lateral movement of the wheels during actuation of the powered means and being elevationally swingable with said support to accommodate variations in the terrain traversed.

4. The mounting system of claim 3 in which said support has transversely opposite ends individually pivotally mounting said inner ends of the parallelogram linkages and having integral sector plates individually extended from said ends in overlying relation to their respectively associated parallelogram linkages, and lock means releasably interconnecting the plates and the linkages to hold the wheels in selectively adjusted laterally spaced positions.

5. A mounting system for the steerable wheels of a vehicle having a manually controllable steering mechanism comprising a support having opposite ends and being pivotally mounted intermediate its ends on the vehicle for limited movement about a substantially horizontal axis, a pair of sets of parallelogram linkages individually providing an axle having an inner end pivotally connected to an end of said support and an opposite outer end, a wheel mounting spindle pivotally mounted on said outer end of the axle having an integral arm extended therefrom, a lever having an outer end pivotally mounted on the arm and an opposite inner end, a link having opposite ends individually pivotally connecting said inner ends of the lever and the axle in spaced substantially parallel relation; a pair of extendible-retractable members borne by the vehicle and individually pivotally connected to said axles for manipulating the parallelogram linkages selectively laterally to adjust the spacing of the wheels from the vehicle and from each other, a connecting arm having opposite ends pivotally connected to the inner ends of said levers in pivotally interconnecting relation to said sets of parallelogram linkages, and means connecting said connecting arm to said steering mechanism for simultaneous movement of the levers and the spindle arms about said outer ends of the axles angularly to adjust the wheels in substantially parallel relation to each other for steering the vehicle in all laterally adjusted positions of the wheels, said parallelogram linkages and said wheels being permitted limited elevational swinging movement about said axis of the support in all laterally adjusted positions of the wheels so as to accommodate variations in the terrain traversed.

6. The mounting system of claim 5 in which the support includes integral sector plates extended from its ends in overlying relation to their respectively associated axles, and lock means releasably interconnecting the plates and the axles to hold the wheels in their selectively laterally adjusted positions.

7. The mounting system of claim 6 in which said sector plates have a plurality of holes therethrough in spaced increments corresponding to predetermined wheel spacings, said axles each providing a hole alignable with said holes in their respective plates, and a lock pin extendible through each of said aligned holes in the axles and plates releasably to hold the wheels in their laterally adjusted positions.

References Cited

UNITED STATES PATENTS

| | | | |
|---|---|---|---|
| 1,210,056 | 12/1916 | Fairman | 280—34 |
| 1,321,258 | 11/1919 | Stinson. | |
| 2,573,040 | 10/1951 | May | 280—96 |
| 2,634,663 | 4/1953 | Curtis | 280—34 X |
| 2,911,229 | 11/1959 | Strehlow | 280—96 |
| 2,936,034 | 5/1960 | Van der Lely et al. | 280—34 X |
| 3,189,364 | 6/1965 | Westphal | 280—36 |
| 3,216,739 | 11/1965 | Drenter | 280—87 X |
| 3,306,390 | 2/1967 | Jamme | 280—34 X |

KENNETH H. BETTS, *Primary Examiner.*